United States Patent [19]

Kawasaki et al.

[11] E Re. 31,585

[45] Reissued May 15, 1984

[54] LONG TIME EXPOSURE PREVENTING DEVICE FOR CAMERA WITH ELECTRONIC FLASH

[75] Inventors: Masahiro Kawasaki; Yoshio Sawada, both of Tokyo, Japan

[73] Assignee: Asahi Kogaku Kogyo Kabushiki Kaisha, Tokyo, Japan

[21] Appl. No.: 391,042

[22] Filed: Jun. 22, 1982

Related U.S. Patent Documents

Reissue of:

[64] Patent No.: 4,209,245
Issued: Jun. 24, 1980
Appl. No.: 944,517
Filed: Sep. 20, 1978

[30] Foreign Application Priority Data

Sep. 20, 1977 [JP] Japan ..... 52-127931

[51] Int. Cl.[3] ..... G03B 7/08; G03B 15/03

[52] U.S. Cl. ..... 354/459; 354/145.1

[58] Field of Search ..... 354/32, 33, 34, 50, 354/51, 60 R, 60 F, 139, 145, 149

[56] References Cited

U.S. PATENT DOCUMENTS

| | | | |
|---|---|---|---|
| 3,792,484 | 2/1974 | Tsujimoto et al. | 354/33 X |
| 4,021,824 | 5/1977 | Uchiyama et al. | 354/149 X |
| 4,079,389 | 3/1978 | Hashimoto et al. | 354/139 X |
| 4,086,582 | 4/1978 | Kiyohara et al. | 354/149 X |
| 4,096,492 | 6/1978 | Land et al. | 354/149 X |
| 4,162,426 | 7/1979 | Tsunekawa et al. | 354/33 X |
| 4,189,219 | 2/1980 | Hasegawa et al. | 354/33 |
| 4,210,849 | 7/1980 | Naya et al. | 354/33 X |

*Primary Examiner*—Michael L. Gellner
*Attorney, Agent, or Firm*—Sughrue, Mion, Zinn, Macpeak & Seas

[57] ABSTRACT

A signal indicating that the correct exposure value has been achieved and a signal indicating the completion of flash are logically summed to provide a shutter closing signal. This ensures that the shutter will be closed even when the light emitted by the flash is insufficient to achieve the proper level of exposure.

24 Claims, 4 Drawing Figures

LONG TIME EXPOSURE PREVENTING DEVICE FOR CAMERA WITH ELECTRONIC FLASH

Matter enclosed in heavy brackets [ ] appears in the original patent but forms no part of this reissue specification; matter printed in italics indicates the additions made by reissue.

BACKGROUND OF THE INVENTION

This invention relates to a long time exposure preventing system in a focal plane shutter camera equipped with a flash generating device (hereinafter referred to as "an electronic flash" when applicable). It is particularly applicable in cameras in which the electronic flash is controlled by a light measurement circuit in the camera.

If the distance between an object and a camera varies in comprising and taking a picture of that object with an electronic flash, it is necessary to adjust or change the aperture value in accordance with the varied distance. This is because the intensity of light reflected by the object will also vary and theshutter speed is usually fixed.

In order to eliminate this inconvenience, in this technology the concept of automatic electronic flash has been proposed. In an automatic electronic flash, an electronic flash is provided with a light measurement circuit. The light measurement circuit operates to measure the quantity of light reflected by the object when the electronic flash emits a flash, and to stop the flashing operation of the electronic flash when the quantity of light measured reaches a correct exposure value. Hence a picture can be taken with the correct exposure at all times.

In general, electric-eye (EE) cameras are provided with light measurement circuits. When a picture is taken with such a camera with the automatic electronic flash described above, the light measurement circuit in the camera is not used. That is, it is in idle state and the camera is used in a manual mode of operation.

Furthermore, recently a circuit has been developed in which the flashing operation of an electronic flash is controlled by using a light measurement circuit incorporated in an electronic focal plane shutter camera. In this case a correct exposure can be readily obtained in taking a picture with an electronic flash without incorporating a light measurement circuit in the electronic flash. With this type of circuit, when the shutter top curtain is allowed to run by shutter release and the light photographing optical path is opened, the "X" contact on the camera is closed to permit the electronic flash to emit a flash. When the quantity of light reflected by the object reaches a correct exposure value, a shutter closing signal is generated by the light measurement circuit, energization of the shutter bottom curtain magnet is suspended, and the shutter bottom curtain is allowed to run. The shutter closing signal is also employed as a signal for stopping the flashing operation of the electronic flash, so that a picture is taken with the correct exposure.

However, since the quantity of light emitted by the electronic flash is limited, the correct exposure is not always obtained for the aperture value set in the camera. For instance, when a film having a sensitivity of ASA 100 is used, a correct exposure cannot be obtained with an electronic flash guide number "32" and an aperture value "F4"; that is, a picture will be underexposed. In this situation, since the correct exposure cannot be obtained, no shutter closing signal is generated by the light measurement circuit in the electronic focal plane shutter camera and as a result the bottom curtain controlling magnet is maintained energized. Therefore, the bottom curtain will not run. In other words, although the electronic flash has been operated to emit a flash of maximum duration, the exposure itself runs for a longer period of time. Such action will undoubtedly lead to poor picture quality due to camera shaking, and may lead to faulty operation and trouble [of] *with* the camera.

SUMMARY OF THE INVENTION

In view of the foregoing, an object of this invention is to provide a light measurement circuit incorporated in an electronic focal plane shutter camera, with the circuit used to control the flashing operation of an electronic flash. Also in the situation when the quantity of light from an object does not reach a correct amount for a proper exposure, the flash of the electronic flash is detected, to provide a shutter closing signal. This will prevent the exposure from continuing for a period of time longer than the required exposure period.

It is another object of this invention to define a circuit that allows a flash picture to be taken in low light levels with complete sequencing of the shutter.

Yet another object of this invention is to define a circuit that allows a flash unit to be used in low light levels in a camera having a memory-less light measurement circuit.

These and other objects of this invention are accomplished in a camera system having a circuit using a logical sum operation to obtain a shutter closing signal generated by the light measurement circuit and the flashing operation of the electronic flash. The circuit employs an optical sensor zero-biased by an operational amplifier with an integrating capacitor in parallel with the amplifier. Amplifier output is delivered to a comparator, with the output being delivered from a variable resistor indicative of film sensitivity. The comparator measures *a* voltage drop and has its output coupled to one terminal of the flash circuit and to an OR gate. The second input terminal of the OR gate receives an inverted signal from the flash unit. *The* OR gate output is used to control the bottom shutter curtain controlling magnet by a logical sum operation.

One embodiment of this invention will be described with reference to the accompanying drawings.

DETAILED DESCRIPTION OF THE PREFERRED EMBODIMENT

Figure 1:
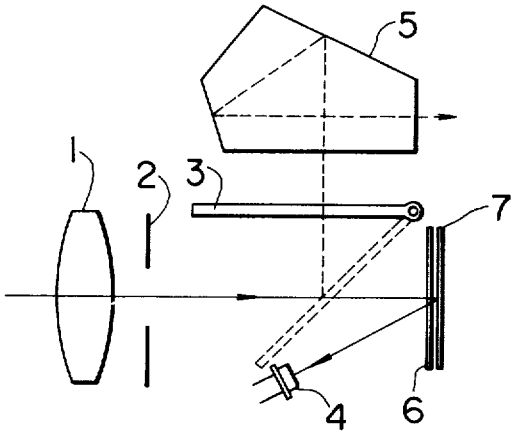
FIG. 1 is an explanatory diagram showing a light receiving method in a memoryless light measurement circuit.

Referring now to FIG. 1 an explanatory diagram showing a light receiving method in *a* memoryless light measurement circuit is shown. When a mirror 3 is swung upwardly by release of the shutter, light from an object is transmitted through a lens 1 and aperture 2 to a shutter top curtain 6 by which it is reflected. This reflected light is measured by a photo-electric element 4. When the shutter top curtain is run, film 7 appears and as a result, light from the object is reflected by the film 7 and that reflected light is measured similarly as in the case of the shutter top curtain 6.

Figure 2:
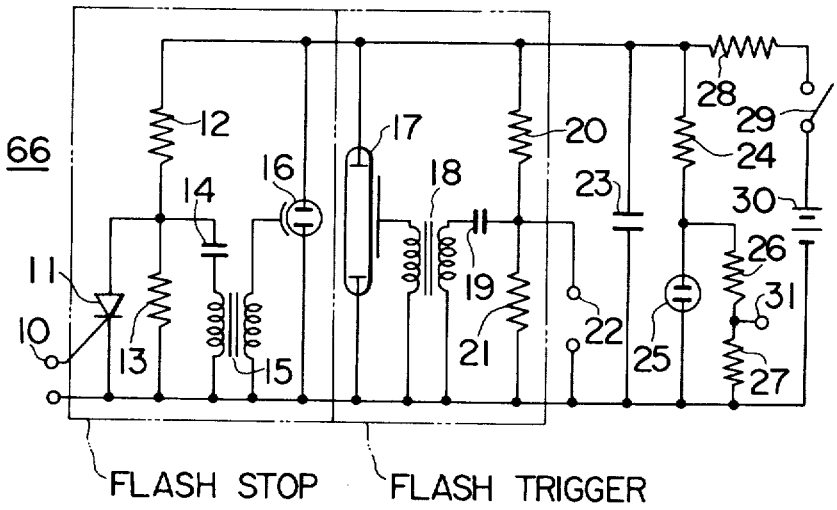
FIG. 2 is a circuit diagram illustrating a flash generating device in one embodiment of this invention.

FIG. 2 is a circuit diagram showing a flash generating device [in] *or* the preferred embodiment of this invention. In this circuit, a high voltage DC electric source 30 is connected through a switch 29 and a resistor 28 to a main capacitor 23. Connected in parallel to the main capacitor 23 is a flash [emissiion] *emission* triggering circuit comprising a flash discharge tube 17, resistors 20 and 21, a capacitor 19 and a flash discharge tube triggering transformer 18.

Furthermore, a flash emission stopping circuit is provided comprising a bypass discharge tube 16, resistors 12 and 13, a capacitor 14, a bypass discharge tube triggering transformer 15 and a thyristor 11. The stopping circuit is also connected in parallel to the main capacitor 23. A voltage divider comprising resistors 26 and 27 is connected in parallel to a neon tube 25 adapted to indicate the charge voltage of the main capacitor 23. Connected in series to this parallel circuit is a resistor 24.

As shown in FIG. 2, element 22 designates terminals to which a [synchronizng] *synchronizing* switch is connected and element 10 designates an input terminal for receiving a flash emission stopping signal. Output terminal 31 is provided to supply a voltage proportional to the charge voltage of the main capacitor 23.

In operation of the FIG. 2 circuit, upon closure of the switch 29 the main capacitor 23 is charged by the high voltage electric source 30. The charge voltage of the capacitor 23 is gradually increased to the voltage of the high voltage electric source 30. When the charge voltage becomes higher than the discharge voltage of the neon tube 25, the neon tube 25 is lit to inform the photographer that the flash unit is ready and fully charged for light emission. If, in this situation, the terminals 22 are short-circuited by the synchro switch, a high voltage is momentarily applied to the triggering transformer 18. As a result the flash discharge tube 17 creates the desired flash.

When a correct quantity of high emission is obtained from the flash unit, a positive pulse is applied to the terminal 10 and the thyristor 11 is rendered conductive. As a result, a high voltage is applied to the trigger electrode of the bypass discharge tube 16 by the triggering transformer 15, and the bypass discharge tube 16 is rendered conductive. The terminal voltage of the flash discharge tube 17 is accordingly decreased to a value lower than the discharge voltage, thus stopping flash emission.

Figure 3:
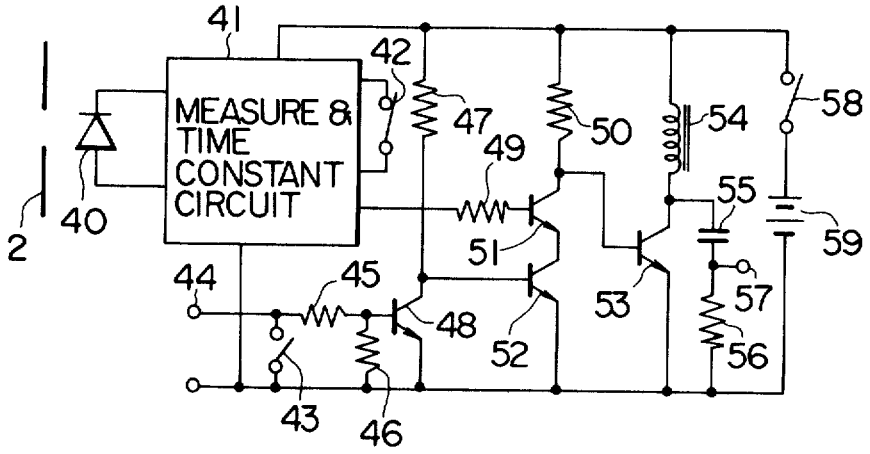
FIG. 3 PRIOR ART
FIG. 3 is a circuit diagram showing a light measurement circuit and a shutter control circuit provided in a camera known in the art.

Referring now to FIG. 3 a prior art circuit including a light measurement circuit and a shutter control circuit provided in a camera is shown. This circuit is described in Japanese Utility Model Application Laid-Open No. 65534/1977. An optical electromotive force element 40 is connected to an assembly 41 of a light measurement circuit and a time constant circuit shown as a block diagram. Such a circuit is well known in the art. The output of the time constant circuit is connected through a resistor 49 to the base of a transistor 51. The collector of the transistor 51 is coupled to an electric source 59 through a resistor 50[. The] *and to the* base of *a* transistor 53 [is] adapted to drive a shutter bottom curtain controlling magnet 54 (hereinafter referred to *merely* as "[a] magnet 54" [when applicable]) [is also connected to the source 50.]

A series circuit of resistors 45 and 46 are connected in parallel to a synchro switch 43. The base of a transistor 48 [employs] *employing* a resistor 47 as its load [and] is connected to the voltage division point of the resistors 45 and 46. The collector of the transistor 48 is connected ot the base of a transistor 52.

The transistors 51 and 52 are connected in series to each other to form a NAND circuit for a magnet driving transistor 53. A series circuit of a capacitor 55 and a resistor 56 is connected in parallel to the transistor 53. Extending from the connection point of the capacitor 55 and the resistor 56 in an output terminal 57 for a flash emission stopping signal. A switch 42 is turned off when the top curtain starts running. The synchro switch 43 is turned on when the running of the top curtain is completed.

The operation of the circuit shown in FIG. 3 will now be described. Information on the brightness of an object and aperture [openings] *opening* 2 is converted into an optical current by the optical electromotive force element 40. An exposure time for the film is determined in accordance with the magnitude of the optical current by the assembly 41 of the light measurement circuit and time constant circuit. As a result, an output is generated which is at a low level during exposure and at a high level when the exposure is completed. Therefore, the state of the transistor 51 is changed from its non-conductive state to its conductive state.

On the other hand, the synchro switch 43 is closed when the running of the shutter top curtain is completed and, as a result, the transistor 48 is rendered non-conductive, while the transistor 52 is rendered conductive. Since the transistors 51 and 52 are connected in series to each other as was described before, it is possible to render the magnet driving transistor 53 non-conductive only when [the transistor] *transistors* 51 [is] *and 52 are* rendered conductive . *Therefore, as soon as the transistor 51 is rendered conductive* by the output signal of the time constant circuit [and], the transistor [54] *53* is rendered non-conductive, as a result of which the magnet 54 is deenergized (OFF) and the flash emission stopping signal is provided at the terminal 57.

In this circuit [controlling] *the control of* the bottom curtain controlling magnet occurs with the NAND logic operation of the output assembly 41 and the [flesh] *flash* emission signal. Hence, it is sometimes impossible to obtain a correct exposure depending on the conditions even if the electronic flash is operated in its correct mode as described above. Accordingly, since no signal indicating that the correct amount of exposure has been obtained is provided by the light measurement and time constant circuit assembly 41 the bottom curtain controlling magnet is not deenergized. The result is that exposure is carried out for an undesirable long period of time.

Figure 4:
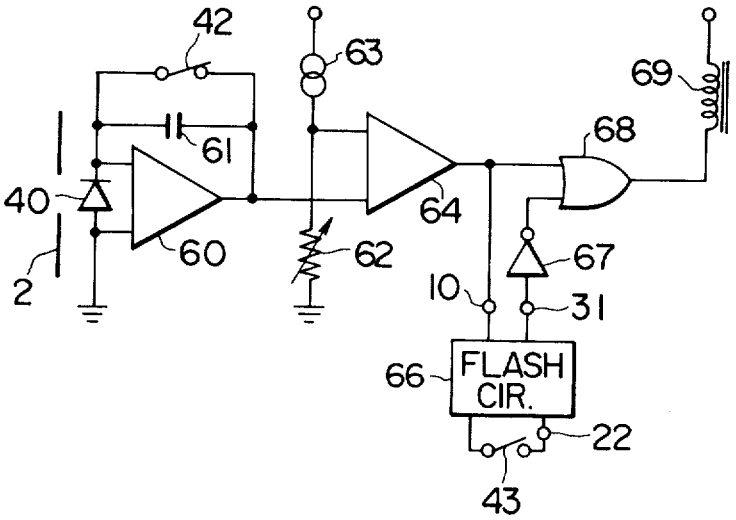
FIG. 4 is a circuit diagram, partly as a block diagram, showing one embodiment of this invention.

Referring now to FIG. 4, *an* embodiment of this invention is shown. This embodiment comprises an optical electromotive force element 40 zero-biased by an operational amplifier 60, an integrating capacitor 61, and a switch 42 connected in parallel to the integrating capacitor 61. The circuit shown in FIG. 4 further comprises: a constant current source 63 connected to a variable resistor 62 and a comparator 64 receiving the voltage drop across the variable resistor 62 and the output of the operational amplifier 60. The output of the comparator 64 is connected to a terminal 10 of a flash generating circuit 66 (FIG. 2) and to one input terminal of an OR circuit 68. The terminal 31 of a flash generating circuit 66 is connected through an inverter 67 to the other input terminal of the OR circuit. Thus, a bottom curtain controlling magnet 69 is driven with a logical sum operation of the OR circuit 68.

The operation of the circuit shown in FIG. 4 will be described. Consider the situation where the brightness of an object is high and the shutter speed is higher than the synchronization speed. Upon depression of the shutter [bottom] *button*, the top curtain starts running, the switch 42 is turned off, and information on the object's brightness and an aperture value is converted into an optical current by the optical electromotive force element 40. The optical current is integrated by the integrating capacitor 61. As a result, the output of the operational amplifier is *gradually increased. The output of the operational amplifier is* then compared with the voltage drop of the variable resistor 62, which may be called "a film sensitivity setting resistor", in the comparator 64. Thus, the output level of the comparator 64 is changed from the low level to the high level, while the output level of the OR circuit 68 is changed from the low level to the high level. As a result, energization of the magnet 69 is suspended, and therefore the bottom curtain runs. Thus, the exposure is completed with the correct shutter open time.

In the situation where the brightness of the object is low and the shutter speed is lower than the synchronization speed, the output of the operational amplifier 60 is gradually increased similarly as in the above-described example, but the output of the comparator 64 has not reached its inversion level. Upon completing of the operation of running the top curtain, the synchro switch 43 is turned on to operate the electronic flash, whereupon the output of the comparator 64 reaches its inversion level. This output of the comparator 64 is applied to the terminal 10 of the flash generating circuit 66 to terminate flash operation. It is also applied to the OR circuit 68 as a signal for deenergizing the magnet 69. When the flash unit emits a flash, the voltage at the terminal 31 of the flash generating circuit 66 is decreased when the flash is terminated, and the output level of the inverter 67 is changed from the low level to the high level, which is employed as another signal for deenergizing the magnet 69. Therefore, the magnet 69 is deenergized by [a] *that* signal for [the] magnet deenergization from the comparator 64 [and secondly by] *or* the flash generating circuit 66 which [was previously] *is earlier* applied to the OR circuit. Although the shutter speed is lower than the synchronization speed, a correct exposure takes place.

In the situation where the electronic flash has emitted a flash but no correct exposure is obtained, that is the light level is too low, the output of the operational amplifier 60 does not reach the inversion level of the comparator 64. Therefore, the output of the comparator 64 is maintained at the low level. However, since the electronic flash has emitted a flash as described, the signal at terminal 31 is lowered to the low level, and the output of the inverter is raised to the high level. As a result [of which], the magnet 69 is deenergized. The shutter will close and the picture will be underexposed, however damage to the camera is avoided and power consumption necessary to energize the magnet is reduced.

As is apparent from the above description, since the bottom curtain controlling magnet is driven by the logical sum operation of the operation of the light measurement circuit and the operation of the electronic flash, the bottom curtain controlling magnet is deenergized by *that* one of the magnet deenergizing signals which occurs earlier. In the case also where no magnet deenergizing signal is provided by the light measurement circuit because the object is far away from the camera and the reflected light is therefore weak, the signal indicating the flashing operation of the electronic flash is still provided and therefore the magnet is deenergized.

Therefore, when a picture is taken with a camera having the memoryless light measurement circuit the light measurement is started in synchronization with the shutter opening operation and the shutter closing signal is generated when the quantity of light measured reaches a correct exposure value. Also, with a generating device that operates in synchronization with the completion of the shutter closing operation of the camera and stops the flashing operation in response to the shutter closing signal of the light measurement circuit, the shutter does not cause a long-time-exposure. That is, it is operated at the synchronizing speed even if no shutter closing signal is generated by the light measurement circuit because the quantity of light reflected by the object is small.

Hence an improved device is obtained that overcomes a material deficiency in the prior art. It is apparent that variations of this invention may be made without departing from the essential scope of the invention.

What is claimed is:

1. In a camera system having a shutter mechanism, a light measurement system to generate a shutter closing signal in response to a correct exposure signal indicative of a correct exposure value, an electronic flash to emit a flash of light in synchronism with the opening of the camera shutter and to suspend the flashing operation in response to a [shutter closing] *said correct exposure* signal, the improvement comprising: logic means for generating a flashing operation signal indicative of the completion of the flash operation, and for generating said shutter closing signal by a logical sum operation of the [corrct] *correct* exposure signal and the flashing operation signal.

2. The camera system of claim 1 wherein said light measurement system includes first logic means for delivering a correct exposure signal output indicative of a correct exposure for a given light intensity and a given film sensitivity, and wherein said logic means to generate said shutter closing signal comprises second logic means for inverting a signal indicative of flash emission by said electronic flash and producing said flashing operation signal as an output thereof and third logic means receiving the outputs of said first and second logic means and providing an output to close the shutter mechanism.

3. The camera system of claim 2 wherein said light measurement system further comprises means for measuring light into the camera, an operational amplifier, said means for measuring being coupled across the inputs of said amplifier for zero biasing, integrating means receiving the output of said means for measuring and delivering an output with said amplifier, resistor means adjustable to film sensitivity and comparator means responsive to said resistor means and said output of said amplifier and integrating means for producing a correct exposure signal indicative of proper shutter opening time for a correct exposure.

4. The camera system of claim 2 wherein said second logic means comprises an inverter for inverting a signal level indicative of the emission of said electronic flash.

5. The camera of claim 2 wherein said third logic means comprises an OR gate receiving outputs of said first and second logic means to close said shutter [mechanisn] *mechanism* and wherein said shutter mechanism comprises magnet means operable with a bottom curtain of said shutter mechanism and said OR gate generates an output to selectively deenergize said magnet means.

6. The camera system of claim 5 wherein said second logic means comprises an inverter for inverting a signal level indicative of the emission of said electronic flash and delivering an output to one input of said OR gate.

7. The camera system of claim 6 wherein said first logic means comprises an operational amplifier, means for measuring light into the camera and delivering an output in response thereto, integrating means receiving the output of said measuring means, an adjustable resistor providing an output indicative of film sensitivity, and comparator means receiving as one input the amplifier and integrating means signals and as a second input the signal from said resistor, said comparator producing an output signal to said OR gate indicative of proper shutter opening time for a correct exposure.

8. The camera system of claim 7 wherein the output of said first logic means is delivered to said flash unit to terminate the emission of light therefrom.

9. The camera system of claim 2 wherein the output of said first logic means is provided to said flash unit to terminate the emission of light therefrom.

10. The camera system of claim 1 further comprises switch means to initiate operation of said first logic means.

*11. A camera system, comprising; means for generating a correct exposure signal indicative of a correct exposure value, flash means for emitting a flash of light, and including flash triggering means, flash stopping means, and an output, said correct exposure signal being applied as an input to said flash stopping means, means connected to said output for producing a signal indicative of the completion of a flash operation, and logic means for forming a logical sum of said flash operation completion signal and said correct exposure signal to generate a shutter closing signal.*

*12. A camera system, comprising; means for generating a correct exposure signal indicative of a correct exposure value, flash means for emitting a flash of light, and including flash triggering means, flash stopping means, and an output, said correct exposure signal being applied as an input to said flash stopping means, means connected to said output for producing a signal indicative of the completion of a flash operation, and means for generating a shutter closing signal in response to said correct exposure signal and said flash operation completion signal.*

*13. A camera system, comprising:*

*a shutter mechanism which closes in accordance with a shutter closing signal;*

*means for generating a correct exposure signal;*

*flash means for performing a flashing operation to generate a flash of light;*

*means for generating a flash operation signal indicative of the completion of said flashing operation; and*

*means for forming a logical sum of said correct exposure signal and said flash operation signal to form said shutter closing signal.*

*14. A camera system as claimed in claim 13, further comprising means for terminating said flashing operation in response to said correct exposure signal.*

*15. A camera system as claimed in claim 13, wherein said logic means comprises OR gate means, said shutter mechanism including magnet means, and said shutter closing signal being applied to said magnet means to effectuate shutter closing.*

*16. A camera system as claimed in claim 13, wherein said correct exposure signal generating means comprises an operational amplifier having inputs and light measuring means coupled across said inputs of said amplifier, integrating means receiving an output of said light measuring means and delivering an output with an output of said amplifier, resistor means adjustable to film sensitivity, and comparator means responsive to said resistor means and a combined output of said amplifier and said integrating means, said comparator means producing said correct exposure signal at an output thereof.*

*17. A camera system as claimed in claim 13, wherein said flash means includes an output terminal for providing a signal in accordance with the charge on said main capacitor, said means for generating said flash operation signal comprising inverter means for receiving and inverting the signal at said output terminal.*

*18. A camera system as claimed in claim 17, wherein said flash means comprises flash triggering means for initiating said flashing operation in response to the operation of a synchro switch, and flash stopping means for terminating said flashing operation in response to said correct exposure signal.*

*19. A camera as claimed in claim 18, wherein said flash means further comprises a main capacitor and a power supply for charging said main capacitor, said flash stopping means and said flash triggering means being arranged in parallel with said main capacitor.*

*20. A camera system as claimed in claim 18, wherein said flash triggering means comprises a flash discharge tube for discharging the charge on said main capacitor to emit light, a transformer for triggering said flash discharge tube and a capacitor coupled between said transformer and said synchro switch.*

*21. A camera as claimed in claim 18, wherein said flash triggering means includes a flash discharge tube for discharging the charge on said main capacitor to emit light, said flash stopping means comprising means for receiving said correct exposure signal, bypass means connected in parallel with said flash discharge tube, and means for rendering said bypass means conductive in response to said correct exposure signal.*

*22. A camera system, comprising, in combination, a camera having a light measurement system, and an electronic flash for emitting a flash of light; said camera including a shutter mechanism, said light measurement system generating a shutter closing signal in response to a correct exposure signal indicative of a correct exposure value, said electronic flash including an input terminal for receiving said correct exposure signal and means for terminating said flash of light in response thereto, said electronic flash further including an output terminal for delivering an output signal indicative of the completion of a flash operation, and said light measurement system further including means for generating said shutter closing signal in response to said electronic flash output signal.*

*23. A camera system, comprising, in combination, a camera and an electronic flash;*

*said camera including: means for generating a correct exposure signal indicative of a correct exposure value, an output terminal for delivering said correct exposure signal to said flash, and means for generating a shutter closing signal in response to either said correct exposure signal or a flash output signal indicative of the completion of a flash emission;*

*said electronic flash including: an input terminal for receiving said correct exposure signal, means for terminating a flash emission in response to said correct exposure signal, means for providing said flash output signal indicative of the completion of a flash emission, and an output terminal for delivering said flash output signal to said camera.*

*24. A camera system comprising the combination of a camera and a flash unit, said camera including means for generating a correct exposure signal, and means for generating a shutter closing signal in response to one of said correct exposure signal and a flash output signal; said flash unit including an input for receiving said correct exposure signal, means for terminating a flash emission in response to said correct exposure signal and means for providing said flash output signal, said output signal being indicative of the completion of a flashing operation.*

* * * * *